US012256485B2

(12) United States Patent
Burgener et al.

(10) Patent No.: US 12,256,485 B2

(45) Date of Patent: Mar. 18, 2025

(54) PULSE ENERGY GENERATOR SYSTEM

(71) Applicant: Ken Gen Energy, LLC, Murray, UT (US)

(72) Inventors: Robert H. Burgener, Park City, UT (US); Shane L. Luke, Heber City, UT (US); Troy Berneck Atkin, Payson, UT (US)

(73) Assignee: Ken Gen Energy, LLC, Murray, UT (US)

( * ) Notice: Subject to any disclaimer, the term of this patent is extended or adjusted under 35 U.S.C. 154(b) by 148 days.

(21) Appl. No.: 18/098,820

(22) Filed: Jan. 19, 2023

(65) Prior Publication Data

US 2023/0232522 A1 Jul. 20, 2023

Related U.S. Application Data

(60) Provisional application No. 63/300,936, filed on Jan. 19, 2022.

(51) Int. Cl.
*H05H 1/48* (2006.01)
*H05H 1/46* (2006.01)

(52) U.S. Cl.
CPC ............ *H05H 1/48* (2013.01); *H05H 1/4645* (2021.05); *H05H 2242/22* (2021.05); *H05H 2242/24* (2021.05)

(58) Field of Classification Search
CPC .... H05H 1/48; H05H 1/4645; H05H 2242/22; H05H 2242/24; G21B 3/004
See application file for complete search history.

(56) References Cited

U.S. PATENT DOCUMENTS

2008/0304522 A1* 12/2008 Mills .................... H01S 3/0959 372/5
2017/0311431 A1* 10/2017 Park .................... C23C 16/0245
(Continued)

FOREIGN PATENT DOCUMENTS

CN 101305014 B * 7/2012 .............. C07F 7/025
CN 109247031 A * 1/2019 ............... G21B 1/00
CN 110494388 A * 11/2019 ............... C01B 3/00
(Continued)

*Primary Examiner* — Abdullah A Riyami
*Assistant Examiner* — Syed M Kaiser
(74) *Attorney, Agent, or Firm* — KIRTON McCONKIE; Evan R. Witt

(57) ABSTRACT

Energy is generated from pulsed electric power sources applied to a gas medium that includes hydrogen. A sealed reactor chamber contains hydrogen. A plasma power supply, such as a DC, AC, or RF power supply, generates a plasma inside the chamber. The pulse energy generator systems use pulsed electric power for the conversion of molecular hydrogen into atomic hydrogen. An inner surface of the reactor chamber is coated with a catalyst to facilitate the reformation of molecular hydrogen from atomic hydrogen under conditions that release excess energy. The catalyst may include tungsten, nickel, titanium, platinum, palladium, and mixtures thereof. A plasma pulse controller connected to the plasma power supply turns the power supply on and off to generate plasma pulses inside the reactor chamber. A pulse time duration may range from 1 nanosecond to 1 millisecond and a dead time between pulses may range from 20 milliseconds to 0.3 seconds.

20 Claims, 10 Drawing Sheets

(56) References Cited

U.S. PATENT DOCUMENTS

| | | | | |
|---|---|---|---|---|
| 2020/0040122 | A1* | 2/2020 | Park | B01D 71/441 |
| 2023/0103643 | A1* | 4/2023 | Kalita | C23C 18/1639<br>156/345.34 |

FOREIGN PATENT DOCUMENTS

| | | | | |
|---|---|---|---|---|
| GB | 2501865 | A | 11/2013 | |
| WO | WO-2009126863 | A2 * | 10/2009 | A61P 1/04 |
| WO | WO-2011037831 | A2 * | 3/2011 | C08J 9/365 |

* cited by examiner

PULSE ENERGY GENERATOR SYSTEM

CROSS-REFERENCE TO RELATED APPLICATION

This application claims the benefit of provisional Application No. 63/300,936, filed Jan. 19, 2022, which application is incorporated herein by reference.

FIELD OF THE INVENTION

This disclosure relates to the generation of thermal energy from a pulsed DC electric power source, a pulsed AC electric power source, or a pulsed radio frequency power source applied to a gas medium that includes hydrogen.

SUMMARY

The disclosed invention relates to an apparatus and method for generating energy from a pulsed electric power source when applied to a gas medium that includes hydrogen.

The pulse energy generator system includes a sealed reactor chamber having an inner surface and an outer surface. The chamber contains hydrogen gas. As used herein, hydrogen gas includes hydrogen, its heavy isotopes deuterium and tritium, and any mixtures thereof.

In some embodiments, a noble gas, such as argon, may be combined with the hydrogen at a volume ratio of noble gas to hydrogen in the range from 1 to 1 to 20 to 1. The noble gas has been found to facilitate plasma formation to dissociate molecular hydrogen into atomic hydrogen due to its low ionizing potential compared to hydrogen.

In some embodiments, an inner surface of the reactor chamber has a surface coating comprising a catalyst. In some embodiments, the catalyst is selected from tungsten, nickel, titanium, platinum, palladium, and mixtures thereof. Without being bound by theory, it is presently believed the catalyst promotes antibonding of molecular hydrogen over bonding of molecular hydrogen.

In some non-limiting embodiments, the catalyst surface coating comprises catalyst particles in the form of nano powder, nano tube, or nano wire having a size in the range from about 4 nanometers to 100 microns. The catalyst particles may be coated with glass to bond to the metal or ceramic interior surface of the reactor chamber. Smaller particle sizes are preferably coated via chemical vapor deposition. The catalyst surface coating may have a thickness of at least 1 μm.

In some embodiments, the pulse energy generator system includes a plasma power supply to generate a plasma inside the reactor chamber.

In some embodiments, a plasma pulse controller is connected to the plasma power supply to turn the plasma power supply on and off and to generate plasma pulses inside the reactor chamber. The plasma controller my include suitable microprocessors and circuitry to produce a plasma pulse having a desired duration and deadtime between pulses having a desired duration.

In some embodiments, the plasma power supply is a DC power supply.

In some embodiments, the plasma power supply is an AC power supply.

In some embodiments, the plasma power supply is a radio frequency power supply coupled to the reactor chamber by an antenna coil.

In some embodiments, a heat exchanger is coupled to an outer surface of the reactor chamber to remove heat generated by the plasma inside the reactor chamber. In some embodiments, a heat exchange flows through the reactor chamber.

In some embodiments, the hydrogen gas in the reactor chamber has a pressure in the range from about 0.5 torr to 30,000 torr or about 40 atmospheres. In some embodiments, the hydrogen gas in the reactor chamber has a pressure in the range from about 1 torr to 80 torr. In some embodiments, the hydrogen gas in the reactor chamber has a pressure in the range from about 20 torr to 60 torr. In some embodiments, the hydrogen gas in the reactor chamber has a pressure in the range from about 0.5 torr to 10 torr.

In some embodiments, the pulse energy generator system includes a plurality of sealed reactor chambers, and a plasma power supply is connected to each of the reactor chambers, and the system is configured to switch the plasma power supply between the reactor chambers in series.

In some embodiments, the plasma power supply and plasma pulse controller provide a pulsed electric power level between about 1 watt and 20,000 watts for each reactor chamber.

In some embodiments, the plasma power supply and plasma pulse controller provide a pulsed electric power level between about 50 watts and 1000 watts for each reactor chamber.

In some embodiments, the plasma power supply and plasma pulse controller provide a pulsed electric power level between about 200 watts and 500 watts for each reactor chamber.

In some embodiments, the reactor chamber comprises a ceramic or metal housing. In some embodiments, the reactor chamber is configurated with a heat exchanger tube passing through the chamber. In some embodiments, the heat exchanger tube comprises an exterior coating comprising a catalyst, as disclosed above, selected from tungsten, nickel, titanium, platinum, palladium, and mixtures thereof.

In some embodiments, the reactor chamber comprises a ceramic or metal housing. In some embodiments, the reactor chamber is configurated with a heat exchanger jacket surrounding an exterior surface of the reactor chamber.

In some embodiments, the reactor chamber comprises oxygen-free copper.

In some embodiments, the plasma power supply operates at a radio frequency. In some embodiments, the plasma power supply operates at a microwave frequency.

The plasma pulse frequency per reactor chamber is preferably between about 3 Hz and 50 Hz per single reactor chamber. In some embodiments, plasma pulse frequency is about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 Hz, where any of the stated values can form an upper or lower endpoint of a range. Without being bound by theory, the plasma pulse frequency per single reactor chamber is selected based upon the lifetime of atomic hydrogen in which the atomic state of hydrogen is between about 20 milliseconds to 0.3 milliseconds before it becomes molecular hydrogen, so that the dead time between pulses allows atomic hydrogen to become molecular hydrogen.

In some embodiments, the plasma reactor chamber comprises a cathode and anode connected to a DC power supply configured to produce an arc between the cathode and anode.

In some embodiments, the plasma reactor chamber comprises of cathode on both ends of the reactor chamber connected to an AC power supply configured to produce an arc between the cathode and cathode.

In some embodiments, the cathode comprises a tungsten filament. In some embodiments, the tungsten filament comprises thorium or another material that has a low work function when heated such as barium, calcium, and aluminum oxides used in common dispenser cathodes. In some embodiments, the tungsten filament is doped with thorium in an amount ranging from 1 to 2 weight percent. Also, lanthanum hexaborides can be sputtered onto the surface of the tungsten filament and can emit electrons. These materials facilitate electrons to be injected into the plasma, help to reduce the cathode from sputtering away, and increase cathode lifespan. This is similar to arc discharge tubes, including fluorescent lamps. In embodiments where the cathode comprises a tungsten filament, the tungsten filament may perform the function of the catalyst coating described above to promote antibonding of molecular hydrogen over bonding of molecular hydrogen. In some embodiments, the catalyst is heated.

In some embodiments, the pulse energy generator system includes at least one ceramic baffle disposed between the anode and cathode. In some embodiments, the pulse energy generator system includes at least one ceramic baffle disposed between the cathode and cathode In some embodiments, the plasma reactor chamber comprises an antenna loop coil at a full dipole wrapped around for magnetic loading for a secondary coil for a transformer configuration, wherein the secondary coil has a minimum ratio of 7 to 1 wrap. In some embodiments, the antenna loop coil is inserted into the reactor chamber under vacuum. In some embodiments, the antenna loop coil is wrapped on the outside of the reactor chamber. In some embodiments, the reactor chamber is a ceramic tube.

The outer surface of the reactor chamber may be coupled with a heat exchanger or disposed in a working heat exchange fluid such as water, R134, isopentane, etc. so that heat produced by the pulse energy generator can be captured and used. In a non-limiting embodiment, a plurality of reactor chambers can be connected and operated by single plasma power supply in a serial configuration.

In some embodiments, the plasma power supply is a DC power supply or an AC power supply. It is electrically connected to a doped or coated tungsten electrode, within the reactor chamber, to provide a source of pulsed DC or AC electric power which generates a plasma inside the reactor chamber.

In some non-limiting embodiments, the plasma power supply comprises a commercially available, low-cost RF frequency generator which produces a common FCC-approved industrial and medical radio frequency of 13.56 MHz, 27 MHz, 433 MHz, or a microwave frequency at 2.45 GHz, which may be used to generate a plasma inside the reactor chamber. Plasma pulses are generated by the plasma pulse controller which modulates operation of the RF power supply at a desired duty cycle, including plasma pulse duration and dead time between plasma pulses.

Without being bound by theory, it is presently believed that pulsing the plasma power supply at a desired plasma pulse frequency or duty cycle sends out a heated compression wave into the hydrogen gas to heat the hydrogen to high temperature, which produces an amount of atomic hydrogen. It believed that a small percentage of atomic hydrogen then collapses on the inside catalyst surface into molecule hydrogen, thus producing high excess heat.

In some non-limiting embodiments, the reactor chamber comprises doped tungsten electrodes separated by a distance in the range from about 0.5 mm to about 30 mm. Non-conductive spacers, such as ceramic washers, may be used to maintain the electrodes from touching the inside surface of the reactor chamber.

In some embodiments, the reactor can be configured in any suitable form or configuration. For example, the reactor chamber may have a rectangular, cylindrical, or other geometric cross-sectional configuration.

Another aspect of the design is the plasma power supply. A DC power supply output into a bridge transistor can deliver both DC and AC sharp pulses at adjustable duty cycles. In some non-limiting embodiments, the plasma pulse may have a time duration in the range from about 1 nanosecond to about 1 millisecond. In some non-limiting embodiments, the plasma pulse may have a time duration in the range from about 1 to 500 microseconds. In some non-limiting embodiments, the plasma pulse may have a duration in the range from about 100 to 200 microseconds. A square pulse edge is desirable to initiate the compression wave to induce atomic hydrogen. In some non-limiting embodiments, the dead time between plasma pulses is in the range from about 20 milliseconds to about 0.3 seconds. In some non-limiting embodiments, the dead time between plasma pulses is 20, 25, 30, 35, 40, 45, 50, 55, 60, 65, 70, 75, 80, 85, 90, 100, 110, 120, 130, 140, 150, 160, 170, 180, 190, 200, 220, 240, 260, 280, or 300 milliseconds, where any of the stated values can form an upper or lower endpoint of a range. In some non-limiting embodiments, the dead time between plasma pulses is in the range from about 20 milliseconds to about 100 milliseconds. In some non-limiting embodiments, the dead time between plasma pulses is in the range from about 20 milliseconds to about 50 milliseconds.

It has been measured that plasma power supply a duty cycle greater than 7% decreases gain in output power. A duty cycle greater than 7% appears to waste energy and does not contribute to the generation of heat. In some embodiments, the duty cycle is less than 7%, less than 6%, less than 5%, less than 4%, less than 3%, less than 2%, less than 1%, less than 0.5%, less than 0.1%, less than 0.05%, less than 0.01%, less than 0.005%, or less than 0.001% where any of the stated values can form an upper or lower endpoint of a range.

It is believed that a lower duty cycle will provide more gain and heat generated output compared to input power. A DC power supply should preferably reach a minimum of 120 volts and 0.002 amps. Higher amps may be used. The plasma power supply may operate at higher voltage, up to about 10,000 volts at very low current. In one non-limiting embodiment, the plasma power supply operates at a voltage up to about 1000 volts at minimal current. In another non-limiting embodiment, the plasma power supply operates at a voltage up to about 600 volts for longer reactor chambers.

It is believed that direct arc DC and AC power supplies can produce a higher percent of atomic hydrogen compared to RF power supplies. This can be seen by the complete blood red color of the plasma, indicating most of the plasma is in the atomic state.

It is believed that RF driven reactor tubes can have long lifetimes, greater than 10 years, because no filaments are used, but less atomic hydrogen is created, and less excess heat is produced.

It is believed that direct arc DC power supplies can have greater than 90 percent atomic hydrogen created and more heat output but at a cost of tube lifetimes of about 4000 to 6000 hours, similar to the lifetime of an ion laser tube.

It is believed that direct arc AC power supplies can have greater than 90 percent atomic hydrogen created at a much longer tube lifetime, greater than 10,000 hours, similar to the lifetime of fluorescent lamps.

Another aspect of the power supply is the ability for a microprocessor to operate and drive multiple reactor chambers one at a time at high pulse frequencies. For example, one to twenty reactor chambers, or more, can be connected to and be operated by one plasma power supply and one plasma pulse controller. The plasma power supply is adjusted to provide a desired output power. The plasma pulse controller is adjusted to provide a desired plasma pulse duration and pulse frequency per reactor chamber. The plasma pulse frequency is adjusted according to the number of reactor chambers being operated by the plasma power supply and plasma pulse controller. For example, if the plasma pulse frequency for one reactor chamber is selected to be 10 Hz, then a pulse frequency of 20 Hz would be used to drive two reactor chambers. Similarly, a plasma pulse frequency of 40 Hz would be used to drive four reactor chambers, and a plasma pulse frequency of 200 Hz would be used to drive twenty reactor chambers. A bridge transistor switch may be connected to each reactor chamber so at higher pulse frequencies, each reactor chamber may receive the same amount of power (watts) and same desired plasma pulse frequency at one at a time using only one plasma power supply. The switch is comparable to an inverse multiplexer.

The power supply may be modified with a capacitor from 1 to 100 microfarads, depending on the exposed area and diameter of the reactor chamber inside diameter. Using capacitors increases current per pulse creating atomic hydrogen. In one non-limiting embodiment, a 75-microfarad capacitor can be used. In a non-limiting embodiment, insulated-gate bipolar transistors (IGBT) can be used to drive the pulse and output channels.

The reactor chambers can be linked in series, which will multiply the net energy output. For example, if one reactor produces 3 times the input energy, then 2 reactors will produce 6 times the input energy, and so on.

BRIEF DESCRIPTION OF THE SEVERAL VIEWS OF THE DRAWINGS

In order that the manner in which the above-recited, and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention, and are not, therefore, to be considered to be limiting of its scope, the invention will be described and, explained with additional specificity and, detail through the use of the accompanying drawings in which.

DETAILED DESCRIPTION OF THE INVENTION

The disclosed invention relates to apparatus and methods for generating energy from pulsed electric power sources.

Without being bound by theory, the pulse energy generator systems disclosed herein involve the conversion of molecular hydrogen into atomic hydrogen. Pulsing energy to dissociate hydrogen to liberate atomic hydrogen. Some hydrogen recombines back to molecular hydrogen may be facilitated by a catalyst surface coating disposed to inside walls of a reactor chamber. This process allows the collapse of the wave function of the molecular hydrogen, at which time it becomes extremely exothermic. Other surface materials, such as oxygen-free copper, platinum alloys or other conductive surfaces, can be used.

Producing either a direct current pulse or an alternating current pulse on electrode materials can liberate a compression wave that can produce atomic hydrogen, and thus produce heat.

Figure 1A:
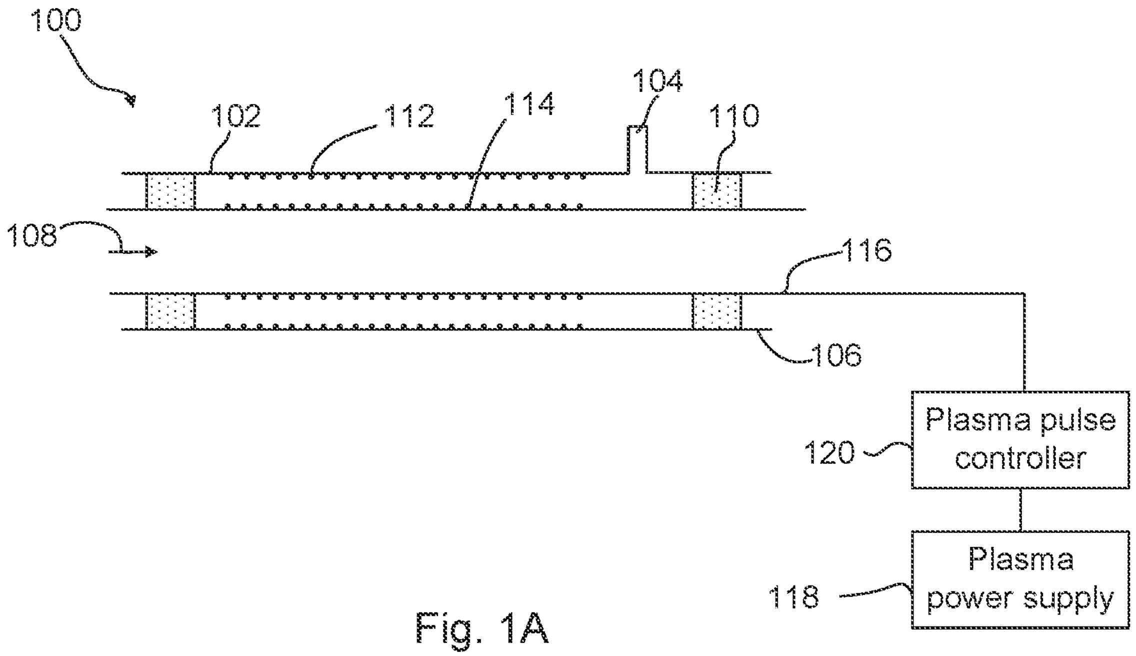
FIG. 1A shows a radio frequency driven reactor with an interior water flow heat exchanger.
Figure 1B:
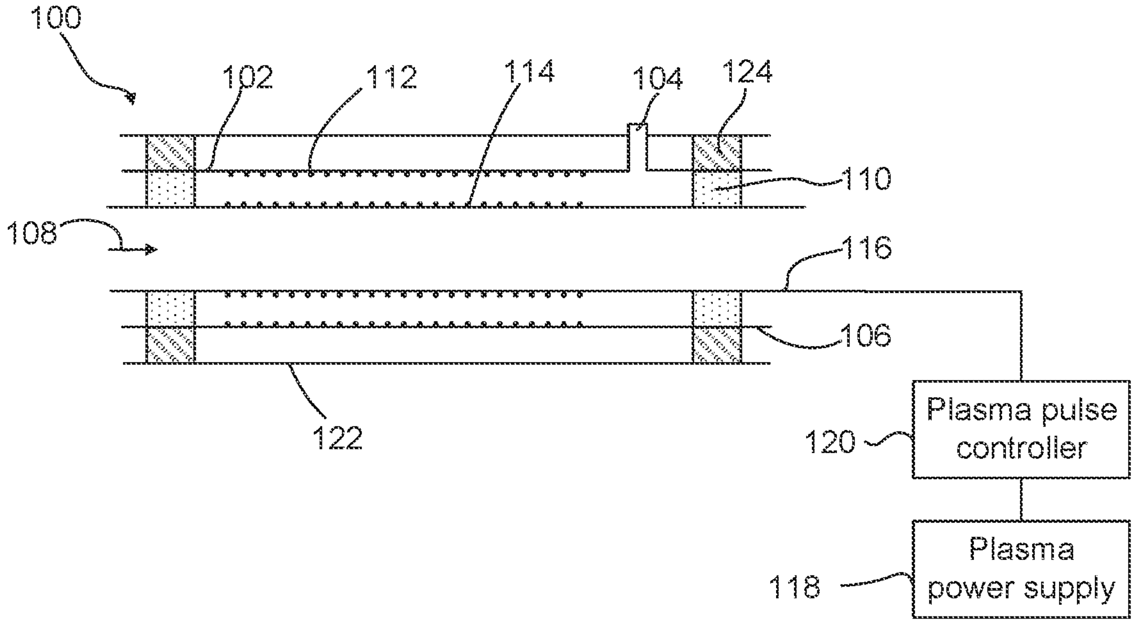
FIG. 1B shows the radio frequency driven reactor of FIG. 1A, and including an outer water jacket heat exchanger.

FIGS. 1A and 1B show a radio frequency driven reactor chamber with an interior water flow heat exchanger. Sealed reactor chamber 100 includes a tube 102 fabricated of oxygen free copper. In an embodiment, the tube 102 has a diameter of about 1 inch. The tube 102 includes a vacuum port 104 which may be used to evacuate the tube and introduce hydrogen into the tube. A heat exchange tube 106 is disposed within tube 102 to permit water or other heat exchange fluid to flow through heat exchange tube 106, as indicated by arrow 108. In an embodiment, the heat exchange tube has a diameter of about 0.5 inches. The heat exchange tube 106 is fabricated of oxygen free copper. Ceramic seals 110 are provided to create a gaseous seal between the exterior surface of the heat exchange tube and the interior surface of the tube 102.

An inner surface of the sealed reactor chamber has a surface coating comprising a catalyst. In the embodiments shown in FIGS. 1A and 1B, a catalyst coating 112 is disposed on an inner surface of tube 102 and a catalyst coating 114 is disposed on an outer surface of heat exchange tube 106. Catalyst coating 112, 114 comprises a catalyst selected from tungsten, nickel, titanium, platinum, palladium, and mixtures thereof. Without being bound by theory, it is presently believed the catalyst promotes antibonding of molecular hydrogen over bonding of molecular hydrogen. In the embodiments shown in FIGS. 1A and 1B, the catalyst coating 112, 114 comprises catalyst particles having a size of about 450 mesh (32 μm). The catalyst particles are coated with glass to bond to the inner surfaces of the reactor chamber. The catalyst coating 112, 114 has a thickness of at least 1 μm.

A radio frequency feed antenna 116 is coupled to the reactor chamber 100. The radio frequency feed antenna 116 is connected to a plasma power supply 118, in this case a radio frequency power supply. The plasma power supply generates a plasma inside the reactor chamber 100. A plasma pulse controller 120 is connected to the plasma power supply 118 to turn the plasma power supply on and off and to generate plasma pulses inside the reactor chamber 100. The plasma controller my include suitable microprocessors and circuitry to produce a plasma pulse having a desired duration and deadtime between pulses having a desired duration.

FIG. 1B illustrates the reactor chamber 100 of FIG. 1A with an additional outer water jacket heat exchanger. The outer water jacket heat exchanger includes an outer water jacket 122 which comprises a tube having a diameter of about 1.75 inches. Rubber seals 124 seal an outer surface of the tube 102 and an inner surface of the outer water jacket 122.

Figure 2A:
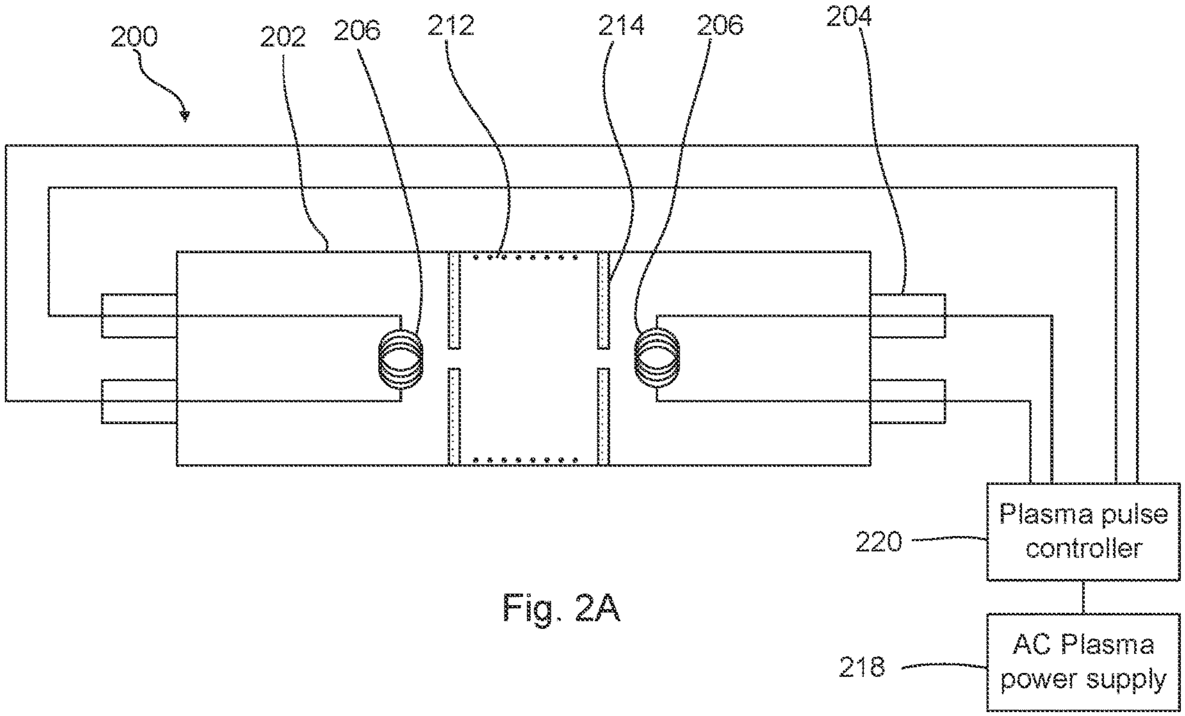
FIG. 2A shows a direct arc reactor chamber configured to be operated by an AC plasma power supply having filament cathodes on both ends of the reactor chamber.
Figure 2B:
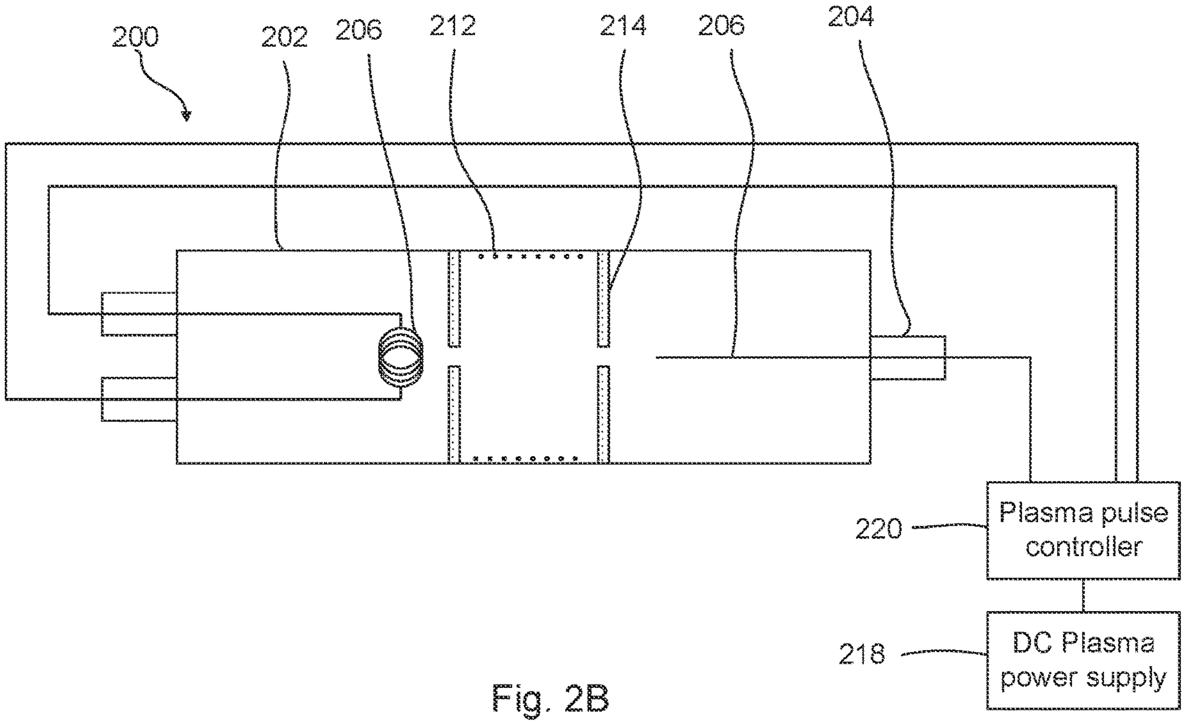
FIG. 2B shows a direct arc reactor chamber configured to be operated by a DC plasma power supply a filament cathode and an anode at opposite ends of the reactor chamber.
Figure 2C:
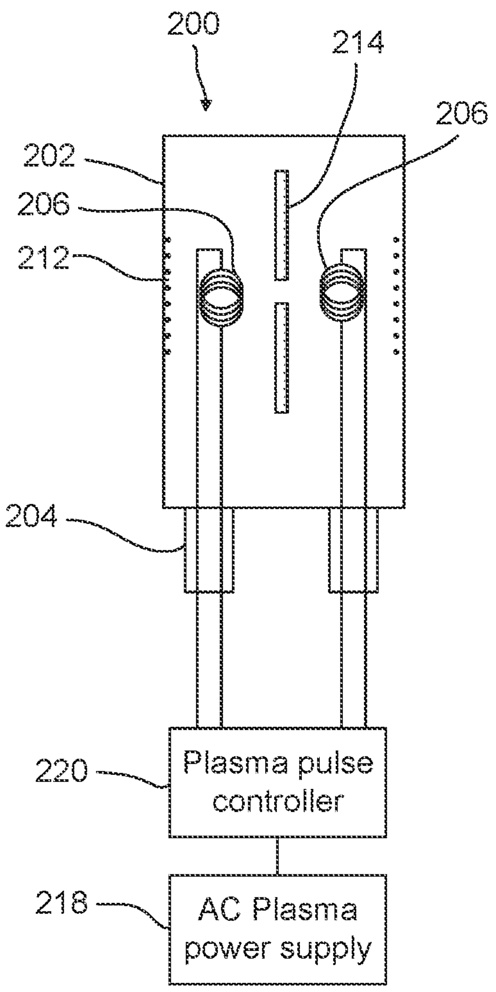
FIG. 2C shows an alternative configuration of a direct arc reactor utilizing a thoriated or other coated or doped tungsten filament cathode for AC mode.
Figure 2D:
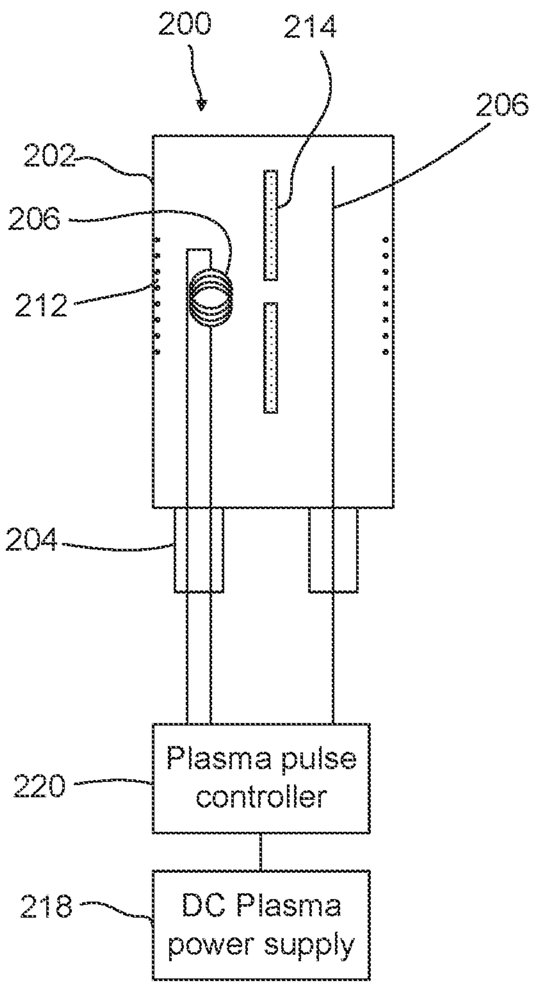
FIG. 2D shows an alternative configuration of a direct arc reactor utilizing a thoriated or other coated or doped tungsten filament cathode.

FIGS. 2A through 2D show configurations of a direct arc reactor chamber. Sealed reactor chamber 200 includes a tube 202 fabricated of oxygen free copper. In an embodiment, the tube 202 has a diameter of about 0.75 inches. In the embodiment of FIG. 2A, each end of tube 202 includes ceramic electrical feedthroughs 204 to permit electric connection to cathode filaments 206. In the embodiment of FIG. 2B, each end of tube 202 includes ceramic electrical feedthroughs 204 to permit electric connection to a cathode filament 206 and to an anode 208. In the embodiment of FIGS. 2C, one end of the tube 202 includes ceramic electrical feed throughs 204 to permit electric connection to cathode filaments 206. In the embodiment of FIGS. 2D, one end of the tube 202 includes ceramic electrical feed throughs 204 to permit electric connection to a cathode filament 206 and to an anode 208.

Cathode filaments 206 are fabricated of tungsten. In some embodiments, the cathode filament 206 is tungsten doped with thorium or another material that has a low work function when heated, such as barium, calcium, and aluminum oxides used in common dispenser cathodes. In some embodiments, the cathode filament is tungsten doped with thorium in an amount ranging from 1 to 2 weight percent. Also, lanthanum hexaborides can be sputtered onto the surface of the tungsten filament and can emit electrons. These materials facilitate electrons to be injected into the plasma, help to reduce the cathode from sputtering away, and increase cathode lifespan.

An inner surface of the reactor chamber 200 has a surface coating comprising a catalyst. In the embodiments shown in FIGS. 2A through 2D, a catalyst coating 212 is disposed on an inner surface of tube 202. Catalyst coating 212 comprises a catalyst selected from tungsten, nickel, titanium, platinum, palladium, and mixtures thereof. The catalyst coating 212 comprises catalyst particles having a size of about 450 mesh (32 μm). The catalyst particles are coated with glass to bond to the inner surfaces of the reactor chamber. The catalyst coating 212 has a thickness of at least 1 μm.

One or more ceramic baffles 214 are disposed between the cathode filaments or between the cathode filament and anode.

The cathode filaments 208 are connected to a plasma power supply 218. In the embodiments shown in FIGS. 2A and 2C, the plasma power supply 218 is an AC power supply. In the embodiments shown in FIGS. 2B and 2D, the plasma power supply 218 is a DC power supply. The plasma power supply 218 generates a plasma inside the reactor chamber 200. A plasma pulse controller 220 is connected to the plasma power supply 218 to turn the plasma power supply on and off and to generate plasma pulses inside the reactor chamber 200. The plasma controller my include suitable microprocessors and circuitry to produce a plasma pulse having a desired duration and deadtime between pulses having a desired duration.

Another related direct arc reactor chamber configuration includes an anode end of copper or other metal tube, and a heated filament cathode on the other end of the tube, used in DC pulse mode.

Another direct arc reactor chamber configuration is a self-ionizing cathode in which the oxide coatings or a lanthanum hexaboride coating are deposited on the ends of the cathode, thereby eliminating a filament transformer. This configuration can operate in AC mode.

The following examples and experimental results are given to illustrate various embodiments within the scope of the present disclosure. These are given by way of example only, it is understood that the following examples are not comprehensive or exhaustive of the many types of embodiments of the present disclosure that can be prepared in accordance with the present disclosure.

In the examples, power input was measured using an oscilloscope. It was found that using a 0.01-ohm shunt resistor in line as the input side of the power supply works well along with power meters. The plasma power supply can be regulated switch mode or a linear power supply. It can be batteries, modified with a capacitor and switching transistor, such as field-effect transistor (FET), insulated-gate bipolar transistor (IGBT), Triac (three terminal AC switch), or silicon-controlled rectifier (SCR) or other switching devices.

In the examples, the measured heat energy out into water was done by measured temperature change and time. Typically, the experiments operated for about 180 seconds, which when multiplied by 4.185 joules per degree C. per gram of water can yield an average energy output. The electrode material was also taken into account and water was insulated to reduce heat loss. This does not take into consideration the energy to dissociate water molecule into hydrogen and oxygen. The 38 Hz or other plasma pulse rates were controlled by a microprocessor.

Figure 3A:
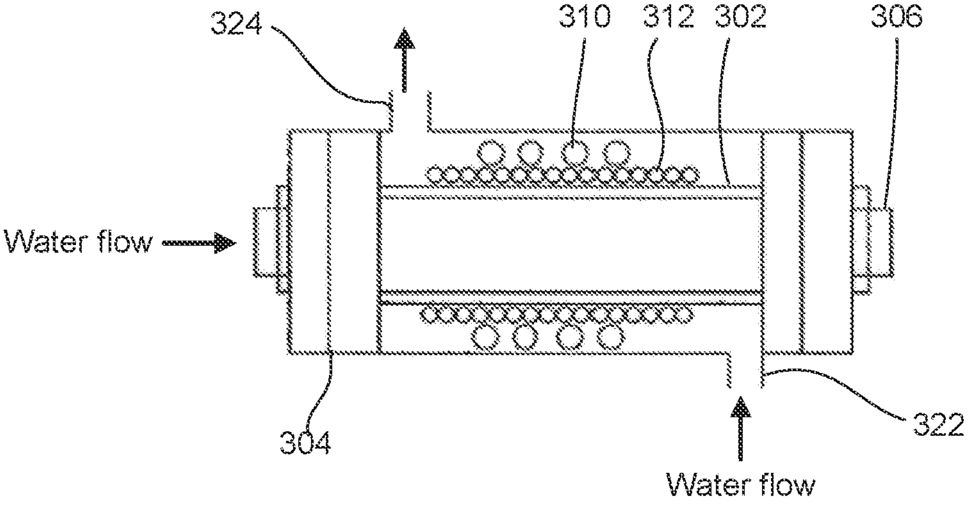
FIG. 3A shows a radio frequency induction driven reactor with an interior water flow heat exchanger and an outer water jacket heat exchanger.

Example 1. The radio frequency driven reactor chamber shown in FIG. 3A. This reactor chamber 300 was a vacuum break 6 inches long alumina ceramic tube 302, and diameter of 1.75 inches. The ends of the ceramic tube 302 were terminated with a 2.75-inch ConFlat® vacuum fitting 304 that was sealed with a 0.5-inch oxygen-free copper heat exchange tube 306 through the center of the vacuum fitting 304 to permit water to pass through the center of the reactor chamber 300. The center 0.5-inch oxygen-free copper tube was coated with glass and further coated with 450 mesh tungsten powder (99.9% purity) until covering the glass.

A pulsed radio frequency at 433 MHz was delivered by a 12 gage induction coil 310, magnetically coupled at ¼ wave at 17.3 cm, wrapped around a 18 gage loading coil 312. The radio frequency was pulsed at a 10 percent duty cycle and at 50 Hz. Winding was on the outside of the ceramic tube. The reactor chamber was configured to allow water to flow in the center of reactor chamber through the heat exchange tube 306 and to flow outside of the windings for cooling/heat exchange purposes through an outer water jacket inlet 322 and an outer water jacket outlet 324.

A high vacuum turbo pump was used to outgas the reactor chamber 300 under a bake out for several hours. Hydrogen was back filled into the clean, room temperature reactor chamber 300 and sealed. Radio frequency power was increased to 50 watts. Those skilled in the art of radio transmitter at 433 MHz, understand that a coaxial cable needs to be phased in due to coherent lengths of wavelengths. The reactor chamber was phased in until standing wave reflected was minimized about 1.5:1. A ratio of 1:1 means 0% standing wave reflected and a ratio of 2:1 means 10% standing wave reflected. A ratio of 2:1 is marginally acceptable. A ratio of 1.5:1 is normal. The reactor chamber was pulsed at 10% duty cycle. The reactor showed a pink glow discharge, and cooling water was circulated. Cooling water was pumped at a rate of about 2 gallons a minute from the bottom of a holding tank having a capacity of about 1100 milliliters that was measured before the pump was placed in the tank. A temperature gage calibrated in C degrees was also placed into the holding tank. The tank was allowed to equalize to room temperature. Calculation used ((milliliters of water)(4.185 Joules)(T1−T2))/time (180 seconds)=Watts out.

Table 1 contains the results of four, three-minute tests.

TABLE 1

| Test | Input Power Level (Watts) | Hydrogen Pressure (Torr) | Water Temperature Start (° C.) | Water Temperature End (° C.) | Power Output (Watts) |
|---|---|---|---|---|---|
| 1 | 50 | 15 | 21.0 | 28.2 | 184 |
| 2 | 50 | 25 | 29.1 | 36.8 | 197 |
| 3 | 50 | 65 | 37.0 | 43.4 | 164 |
| 4 | 100 | 25 | 44.2 | 51.8 | 194 |

Figure 3B:
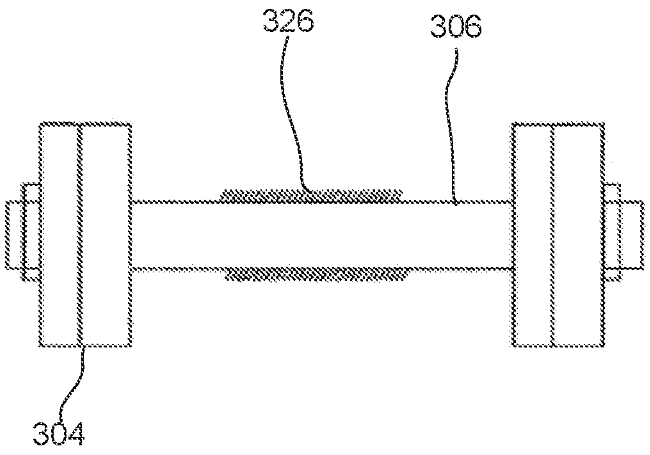
FIG. 3B shows the inside core of the reactor shown in FIG. 3A.

Example 2. Radio Frequency driven reactor shown in FIG. 3B. FIG. 3B shows the inside core of the reactor chamber 300 of FIG. 3A with a modified center water flow heat exchange tube 306. This reactor chamber is similar to the reactor chamber of Example 1, except that the 0.5 inch copper middle core was replaced with a 0.75 inch oxygen-free copper core. The center 0.75 inch copper core was coated with catalyst coating 326 comprising glass and 450 mesh tungsten powder covering the glass. The plasma power supply operated at a radio frequency 433 MHz. It was pulsed at 50 Hz and a duty cycle of about 7 to 10 percent.

Table 2 contains the results of two, three-minute tests.

TABLE 2

| Test | Input Power Level (Watts) | Hydrogen Pressure (Torr) | Water Temperature Start (° C.) | Water Temperature End (° C.) | Power Output (Watts) |
|---|---|---|---|---|---|
| 1 | 50 | 25 | 25.7 | 34.5 | 235 |
| 2 | 100 | 65 | 35.1 | 44.9 | 251 |

Note: Specific heat of the 316 stainless steel ConFlat® ends is 0.49 J. They heated up. They were not included in this calculation.

Example 3. Radio Frequency reactors with inner antenna:

This radio frequency reactor chamber was made with oxygen-free copper tubing. A middle copper tube was 0.75-inch diameter. The outer surface was coated with glass and coated with 450 mesh tungsten powder until covering the glass. The middle copper tube was 17.3 centimeters long and welded to a ceramic feedthrough that allowed fluids to flow through. An outer tube was 1.5-inch diameter. It was longer to accommodate the welding to the feedthroughs. A radio frequency source was connected to the middle tube as an antenna. The reactor chamber was filled with hydrogen. Table 2 contains the results of two, three-minute tests at 27 MHz frequency.

TABLE 2

| Test | Input Power Level (Watts) | Hydrogen Pressure (Torr) | Water Temperature Start (° C.) | Water Temperature End (° C.) | Power Output (Watts) |
|---|---|---|---|---|---|
| 1 | 50 | 15 | 22.3 | 27.5 | 133 |
| 2 | 100 | 25 | 28.1 | 33.4 | 135 |

Note: This reactor chamber was more stable and easer to tune and maintain compared to the reactor chambers of Examples 1 and 2.

Example 4. Direct Arc Reactor Chamber:

A direct arc reactor chamber was prepared from a beryllium oxide ceramic tube terminated with an iron-nickel-cobalt alloy (Kovar) ends with a dispenser cathode on one end and the other end acting as an anode. Kovar material has a coefficient of thermal expansion matched to beryllium oxide ceramic tube. The bore ceramic was 0.040-inch diameter and was 3 inch in length with outer return paths. The reactor chamber was processed on vacuum station and baked out to 300° C. for 12 hours on an ion pump to clean and outgas the chamber. The plasma power supply was run at low current, approximately 2 amps, sufficient to maintain the plasma from going out and was increased up to 6 amps with a 10% duty cycle at 50 Hz.

Argon gas was used for starting the reactor chamber before hydrogen was placed in the reactor. Direct arcs may be produced in argon, or other noble gas, using less energy compared to using pure hydrogen. The direct arc reactor chamber was initially run with argon at 1 torr during start up until it was stabilized. Stability of the direct arc reactor chamber is observed when plasma power supply voltages remain stable and do not increase out of control. Input power was 550 watts, and the plasma pulse frequency was 50 Hz. Plasma power supply voltage was 90 volts at 6 amps. Half of the argon was evacuated down to 0.5 torr and then the reactor chamber was back filled with hydrogen to 1 torr. The glow discharge of reactor was now red due to the presence of atomic hydrogen, and the power level was stable. Water flow was circulating on the outside of the reactor from a small pump in 5 gallons of water or 19,927 ml. Red silicon rubber seals were used to electrically isolate the water from the cathode and anode ends. The cathode end had no cooling. In 60 seconds, the initial water temperature increased from 22.2° C. to 25.16° C. An output of 1375 watts output was calculated.

Note: The silicon seals did not hold up and started leaking.

Example 5. The direct arc reactor chamber of Example 4 was re-engineered with ⅜-inch copper tubing wrapped around the outer ceramic side in order to water cool the reactor chamber and anode, but the cathode was left with no cooling.

The re-engineered direct arc reactor chamber was tested as described in Example 4. It was back filled with hydrogen to 1.2 torr. It was operated for 3 minutes. The output power of 1425 watts was calculated.

Note: The direct arc reactor chamber was unable to have higher hydrogen pressures without higher voltages. The more hydrogen the more reaction and output power. The reactor ultimately went unstable. In this case, the instability was caused by outgassing of oxygen. Instability may be caused by failing to adequately clean and fully vacuum process the reactor chamber.

Figure 4:
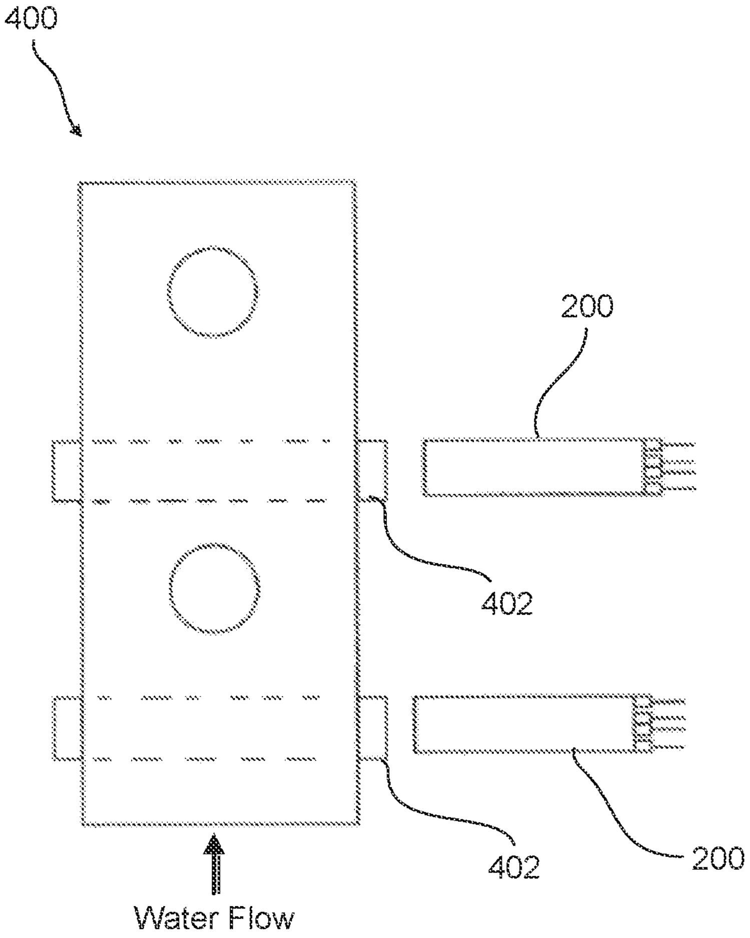
FIG. 4 shows an embodiment having multiple direct art reactors.

FIG. 4 shows an optional water flow channel 400 configured to receive multiple direct arc reactor chambers 200, such as those shown in FIGS. 2A-2D. In an embodiment, the water flow channel 400 may be fabricated of a metal, such as copper tube. The water flow channel includes a plurality of inserted tubes 402, into which the reactor chambers 200 are removably disposed. The inserted tubes 402 may be fabricated of metal, such as copper.

Figure 5A:
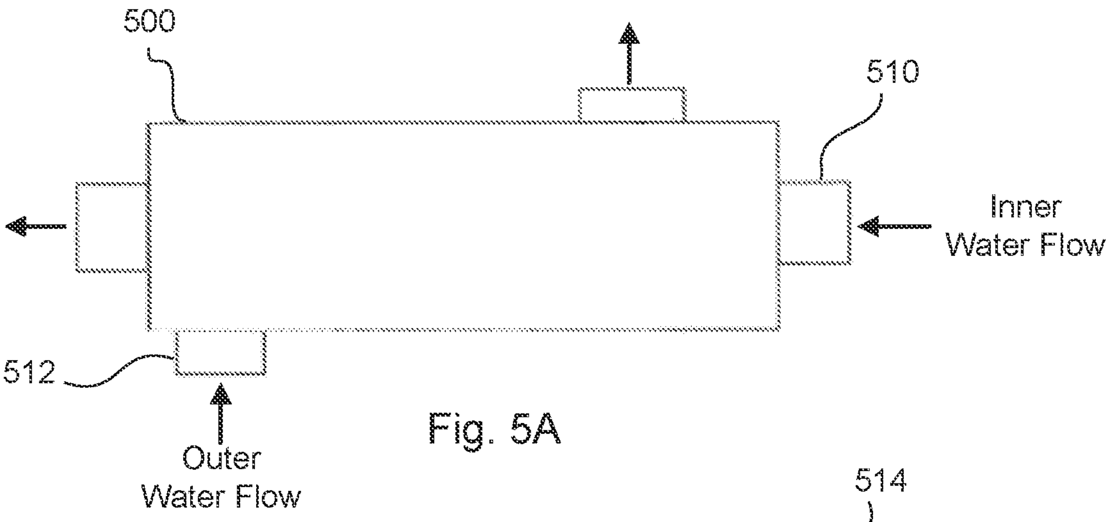
FIG. 5A shows an embodiment of a radio frequency driven reactor with an interior water flow heat exchanger and an outer water jacket heat exchanger with cross, counter-current water flow relative to the interior water flow.
Figure 5B:
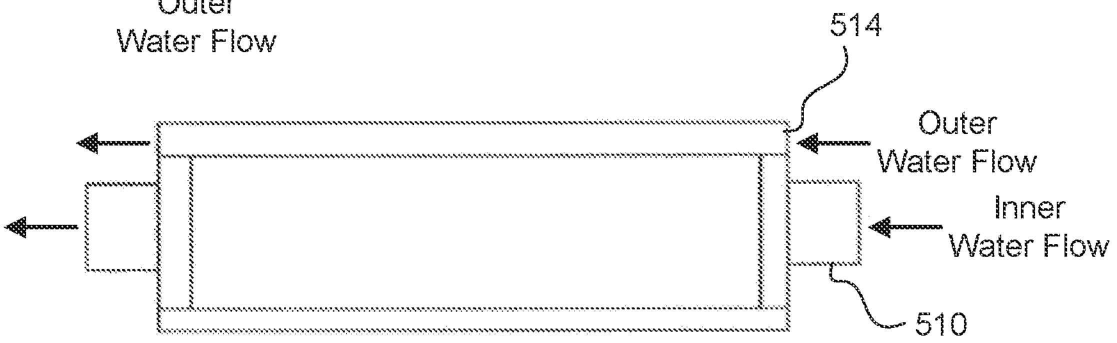
FIG. 5B shows an embodiment of a radio frequency driven reactor with an interior water flow heat exchanger and an outer water jacket heat exchanger with co-current water flow relative to the interior water flow.
Figure 5C:
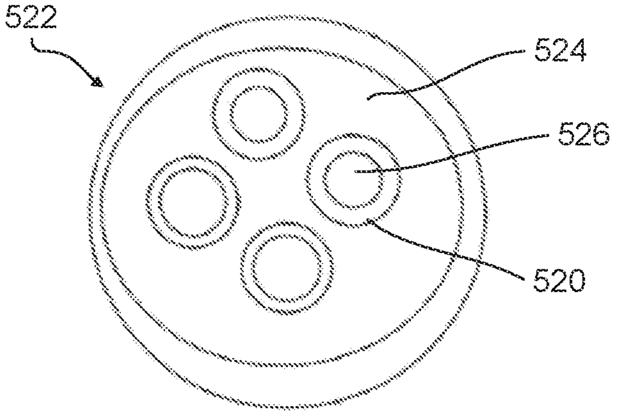
FIG. 5C shows an end view embodiment of multiple radio frequency driven reactor chambers within a water flow channel.

FIGS. 5A-5C illustrate an optional water flow channel configuration to receive multiple radio frequency driven reactor chambers, similar to the reactor chambers 100 shown in FIGS. 1A-1B. FIG. 5A shows a reactor chamber 500 with inner water flow 510 for heat exchange passing through the interior of the reactor chamber and outer water flow 512 for heat exchange passing on an outer surface of the reactor chamber. Water flow 512 is a counter current cross flow configuration. FIG. 5B shows a reactor chamber 500 with an alternative outer water flow 514 configuration. Water flow 514 is a co-current flow configuration. It will be appreciated that many other water flow configurations for heat exchange may be used herein.

FIG. 5C is a schematic cross-sectional end view showing a cluster of four reactor chambers 520 disposed within a water flow channel 522. The water flow channel 522 permits outer water flow 524 on the outside of the reactor chambers 520 and inner water flow 526 on the inside of the reactor chambers 520.

Figure 6A:
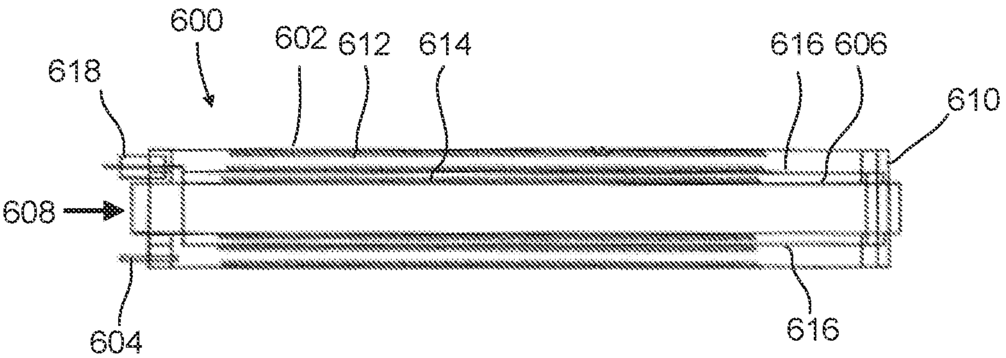
FIG. 6A shows a radio frequency driven reactor chamber configured to operate at a higher plasma frequency, such as for example 433 MHz up to 915 MHz, and beyond. The reactor chamber uses only one ceramic electrical feed-through that reduces manufacturing expense. The antenna floats inside an outer metal tube and an inner metal tube using machine ceramic washers to keep it isolated. The disclosed reactor includes an interior water flow heat exchanger.

FIG. 6A shows a radio frequency driven reactor chamber 600 configured to operate at a higher plasma frequency, such as for example 433 MHz up to 915 MHz, and beyond. The reactor chamber 600 is similar to the reactor chamber 100, shown in FIG. 1A.

Reactor chamber 600 includes a tube 602 fabricated of oxygen free copper or stainless steel. In an embodiment, the tube 602 has a diameter of about 1.8 inches. The tube 602 includes a vacuum port 604 which may be used to evacuate the tube and introduce hydrogen into the tube. A heat exchange tube 606 is disposed within tube 602 to permit water or other heat exchange fluid to flow through heat exchange tube 606, as indicated by arrow 608. In an embodiment, the heat exchange tube has a diameter of about 0.75 inches. The heat exchange tube 606 is fabricated of oxygen free copper. Ceramic seals 610 are provided to create a gaseous seal between the exterior surface of the heat exchange tube 606 and the interior surface of the tube 602.

An inner surface of the sealed reactor chamber has a surface coating comprising a catalyst. In the embodiment shown in FIG. 6A, a catalyst coating 612 is disposed on an inner surface of tube 602 and a catalyst coating 614 is disposed on an outer surface of heat exchange tube 606. Catalyst coating 612, 614 comprises a catalyst selected from tungsten, nickel, titanium, platinum, palladium, and mixtures thereof. Without being bound by theory, it is presently believed the catalyst promotes antibonding of molecular hydrogen over bonding of molecular hydrogen. In the embodiment shown in FIG. 6A, the catalyst coating 612, 614 comprises catalyst particles having a size of about 5 to 10 nm.

A radio frequency feed antenna 616 is coupled to the reactor chamber 600. Reactor chamber 600 uses only one ceramic electrical feedthrough 618 that reduces manufacturing expense. The antenna floats inside the outer metal tube 602 and an inner heat exchange tube 606 using machine ceramic washers to keep it isolated.

Figure 6B:
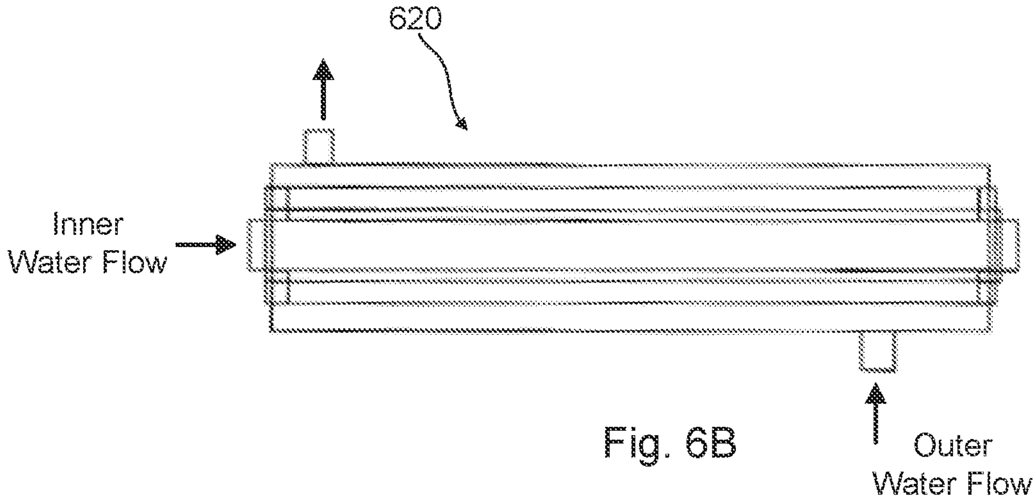
FIG. 6B shows the radio frequency driven reactor of FIG. 6A and includes an outer water jacket heat exchanger.

FIG. 6B is an outside view of the radio frequency driven reactor of FIG. 6A disposed inside an outer water jacket heat exchanger 620. The outer water jacket heat exchanger 620 may be fabricated of any suitable water compatible material, such as polyvinylchloride (PVC) or stainless steel.

Figure 6C:
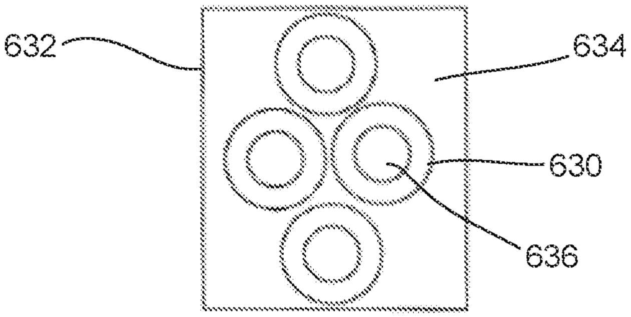
FIG. 6C shows an embodiment having multiple reactor chambers within a water flow channel.

FIG. 6C is a schematic cross-sectional end view showing a cluster of four reactor chambers 630 disposed within a water flow channel 632. The water flow channel 632 permits outer water flow 634 on the outside of the reactor chambers 630 and inner water flow 636 on the inside of the reactor chambers 630.

Figure 7:
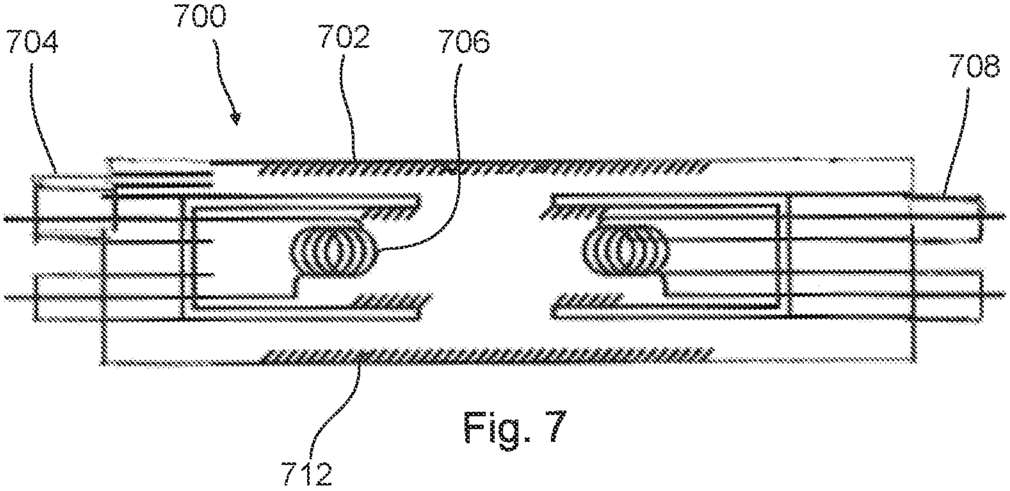
FIG. 7 shows another embodiment of a direct arc reactor chamber.

Example 6. A small direct arc reactor chamber 700 was built using an oxygen-free copper tube 702, 0.75-inch diameter and 2-inch length, as shown in FIG. 7. The tube 702 includes a vacuum port 704 which may be used to evacuate the tube and introduce hydrogen into the tube.

Each end of the reactor chamber 700 contained a thorium-doped tungsten filament cathode 706 made from 0.4-inch diameter tungsten wire having five turns at 0.25-inch diameter. The thorium concentration in the tungsten was 2 wt. % to help ionize the gases for electron emission and arc formation. Each cathode was spaced 3 millimeters distance from each other. Each end of tube 702 included ceramic electrical feedthroughs 708 to permit electric connection to cathode filaments 706.

An interior surface of the reactor chamber included a catalyst coating 712. The catalyst coating 712 comprised tungsten and nickel nano-particles having a size in the range of 5 to 20 nanometers.

This small direct arc reactor chamber 700 operated at a voltage of 390 volts DC, and 20 microfarads capacitor, and a plasma pulse frequency of 20 Hz. The capacitor pushes stored energy as a pulse $E=1/2CV^2$, where C is 20 microfarads, V is the voltage, and E is the energy in joules.

The direct arc reactor chamber was started as described above in Example 4. There was insufficient water cooling of the direct arc reactor chamber. The input power average was kept low, under 7 watts. The output power was extrapolated from the mass of the copper and the temperature change. It was calculated to be 107 watts.

Example 7. The pulse energy generator system was built having a reactor chamber placed over a tungsten-coated half-inch spiral copper coil that was 5 inches long. The assembly was placed inside a 4-inch inner diameter tube 12 inches long with a 6-inch ConFlat® vacuum flange. The system was evacuated and filled with hydrogen gas to 36 torr. A DC power supply was operated for 3 seconds, with a low duty cycle of 3 percent. The average input power was 20 watts. The ending water temperature change was 2.5 degrees C. with 1000 ml of water circulating with a water pump. The output power was 58.12 watts.

Example 8. The pulse energy generator system of Example 6 was operated. The hydrogen gas was adjusted to 76 torr. Almost 3.3 degree C. temperature change was observed over 180 seconds, which showed 76.67 watts output power.

Figure 8:
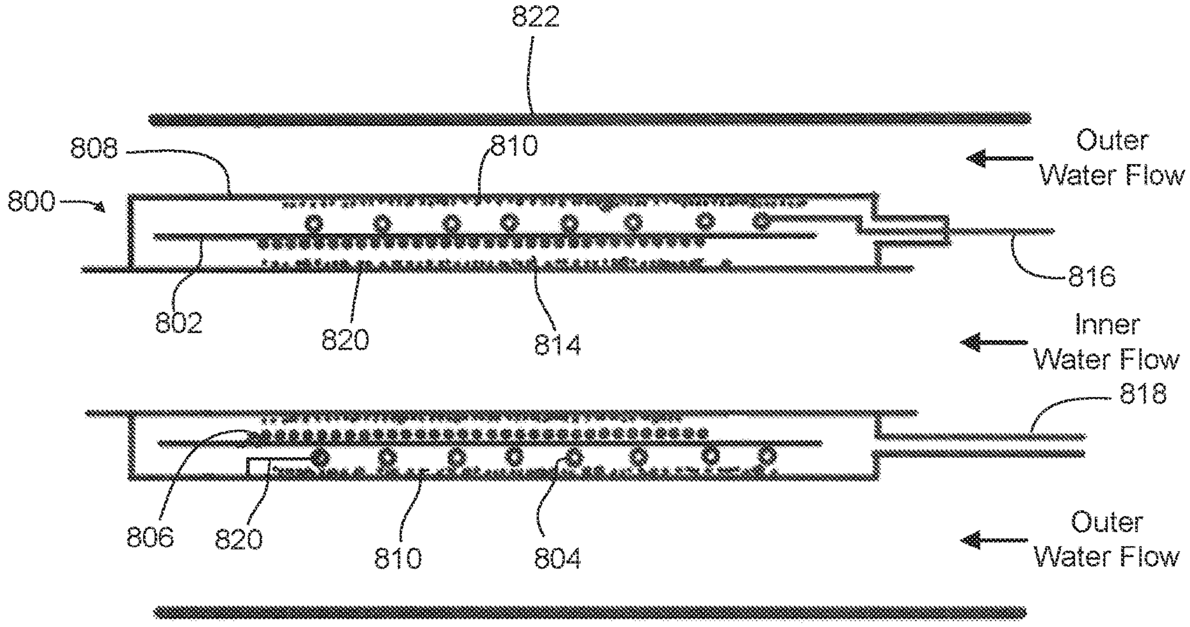
FIG. 8 shows an embodiment of a radio frequency driven reactor chamber.

Example 9. The pulse energy generator system shown in FIG. 8 includes a reactor chamber 800 having an alumina ceramic tube 802. A magnetic loop antenna 804 was wrapped around an alumina ceramic tube 802. The ceramic tube 802 was 1.6-inch diameter and 3.5 inches in length having a 0.125-inch wall thickness. The magnetic loop antenna coil 804 comprised a 0.060-inch diameter and 27.3-inch wire length, cut for 433 MHz. The ceramic tube 802 further included a 0.025-inch diameter secondary wire coil 806 placed into 31 grooves cut into the ceramic at 0.030-inch depth.

This ceramic coil transformer was inserted into a 2-inch oxygen free copper tube 808 which had a catalyst coating 810 of tungsten powder on the inside of the copper tube. The catalyst coating 810 was made with 45 μm size tungsten powder bonded with glass with sodium silicate to the copper. An inner oxygen free copper tube 812 was disposed within the ceramic tube 802. The tube 812 had 0.75-inch diameter and a catalyst coating 814 on the outside of the tube. The catalyst coating 814 was made with 45 μm size tungsten powder bonded with glass with sodium silicate to the exterior surface of tube 812. The tube 812 was inserted into the ceramic tube 802. Oxygen free copper washers were mounted on the ends, together with an electrical feedthrough 816 and a vacuum pinch off tube 818. One end of the magnetic loop antenna coil 804 was coupled a ground 820. An exterior water jacket 822 was provided to permit water flow for heat exchange on the exterior surface of reactor chamber 800.

In testing, the reactor chamber 800 was phased in using a slider to tune in with a standing wave ratio (SWR) of about 1.2. Higher frequencies have shorter wavelengths. 433 Mhz has a standing wave of 69.3 centimeters for the antenna to radiate from the transmitter. Because a coaxial cable extends to the antenna, in this case a magnetic loop antenna inside the reactor, the actual distance is greater than 69.3 cm, typically greater than 200 centimeters long. The sliding tube within a tube is brass metal used to either lengthen the total length or shorten the total length so that it becomes a length which is a multiple number to the standing wavelength. For example, 200 centimeters total cable and antenna would be extended by the slider to about 207 centimeters, so that it would have a length of about 3 times 69.3 cm and has 3 full standing waves and 9 nodes. This would radiate close to 90% power into the reactor chamber. If the length was less than 207 centimeters, such as 200 centimeters, then 7 centimeters would reflect back into the transmitter causing a lot of waste heat and detuning the resonance of the antenna. Less power would be delivered into the reactor chamber basically detuning the resonance. Longer wavelengths can be tuned using a variable capacitor and inductor.

The RF input power was calculated to be 70 watts, pulsed at 40 percent duty cycle with a plasma pulse frequency at about 45 Hz. The output power was calculated to be 135 watts.

Figure 9:
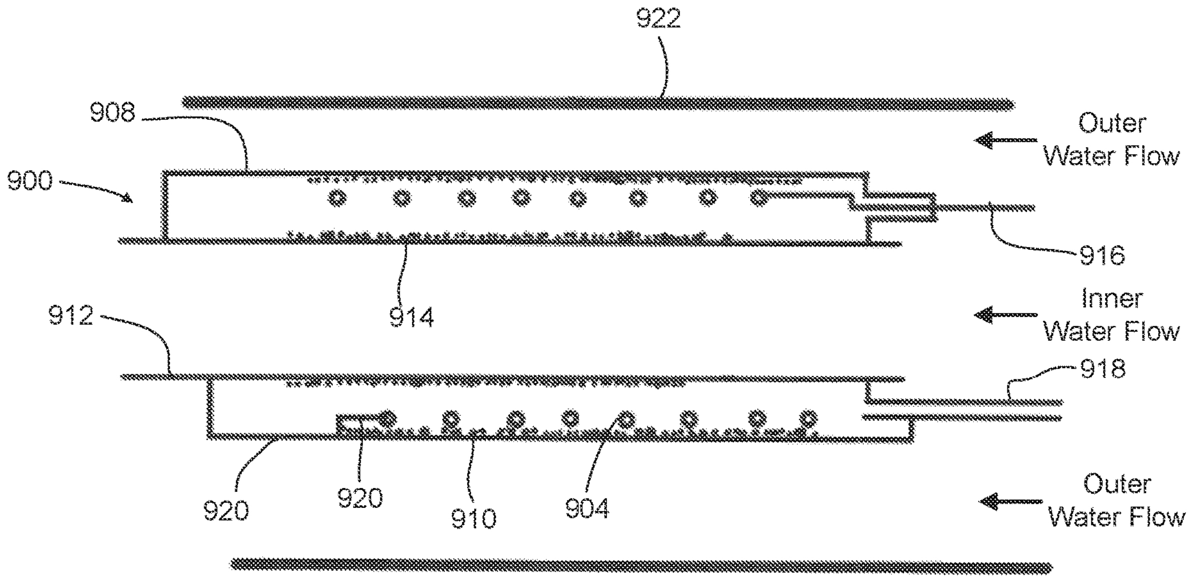
FIG. 9 shows another embodiment of a radio frequency driven reactor chamber.

Example 10. The pulse energy generator system shown in FIG. 9 includes a reactor chamber 900. The reactor chamber 900 included an outer tube 908 made of 2 inch diameter oxygen free copper. Tube 908 had a catalyst coating 910 of tungsten powder on the inside of the copper tube. The catalyst coating 910 was made with 45 μm size tungsten powder bonded with glass with sodium silicate to the copper. An inner oxygen free copper tube 912 was disposed within the tube 908. The inner tube 912 had 0.75-inch diameter and a catalyst coating 914 on the outside of the tube. The catalyst coating 914 was made with 45 μm size tungsten powder bonded with glass with sodium silicate to the exterior surface of tube 912. The inner tube 912 was inserted into the outer tube 908. A magnetic loop antenna coil 904 was disposed between the inner tube 912 and the outer tube 908. Oxygen free copper washers were mounted on the ends, together with an electrical feedthrough 916 and a vacuum pinch off tube 918. One end of the magnetic loop antenna coil 904 was coupled a ground 920. An exterior water jacket 922 was provided to permit water flow for heat exchange on the exterior surface of reactor chamber 900.

The configuration of reactor chamber 900 was substantially the same as reactor chamber 900 of Example 8, but without the inner ceramic core and just a magnet loop antenna cut for 433 MHz. The antenna 904 was phased in using an adjustable slider in which the standing wave reflected was minimized. The input power was 70 watts, and the output power was 100 watts. The average output power was 140% over the input power.

In Example 10 the initial duty cycle was 40 percent. Upon reducing the duty cycle to 20 percent, the input power was reduced to 35 watts while keeping the output power the same. Thus, it was measured that the reduced duty cycle reduced the input power and kept the output power the same.

While this disclosure has been particularly shown and described with references to preferred embodiments thereof, it will be understood by those skilled in the art that various changes in form and details may be made therein without departing from the scope of the disclosure encompassed by the appended claims.

The invention claimed is:

1. A pulse energy generator system comprising:

a sealed reactor chamber having an inner surface and an outer surface, wherein the reactor chamber contains hydrogen gas which contacts the inner surface, wherein the inner surface of the chamber has a surface coating comprising catalyst particles which interact with the hydrogen gas selected from tungsten, nickel, titanium, platinum, palladium, and mixtures thereof, wherein the catalyst particles have a size in a range from 4 nanometers to 100 microns;

a plasma power supply to generate a plasma inside the reactor chamber, wherein the plasma power supply is selected from a DC power supply, an AC power supply, and a radio frequency (RF) power supply;

a plasma pulse controller connected to the plasma power supply to turn the plasma power supply on and off and to generate plasma pulses inside the reactor chamber; and a heat exchanger coupled to the reactor chamber to remove heat generated by the plasma.

2. The pulse energy generator system according to claim 1, wherein the hydrogen gas has a pressure in a range from 0.5 torr to 30,000 torr.

3. The pulse energy generator system according to claim 1, wherein the hydrogen gas has a pressure in a range from 20 torr and to 60 torr.

4. The pulse energy generator system according to claim 1, wherein the hydrogen gas has a pressure in a range from 0.5 torr and to 10 torr.

5. The pulse energy generator system according to claim 1, wherein the pulse controller produces plasma pulses having a pulse time duration in a range from 1 nanosecond to 1 millisecond and a dead time between pulses in a range from 20 milliseconds to 0.3 seconds.

6. The pulse energy generator system according to claim 1, wherein the pulse controller operates the plasma power supply at a duty cycle less than 7%.

7. The pulse energy generator system according to claim 1, wherein the reactor chamber contains the hydrogen gas and a noble gas.

8. The pulse energy generator system according to claim 7, wherein the hydrogen gas and the noble gas are present at a volume ratio of the noble gas to the hydrogen in a range from 1 to 1 to 20 to 1.

9. The pulse energy generator system according to claim 1, where the catalyst comprises tungsten.

10. The pulse energy generator system according to claim 1, where the catalyst particles are in the form of nano powder, nano tube, or nano wire.

11. A pulse energy generator system comprising:

a plurality of sealed reactor chamber having an inner surface and an outer surface, wherein each reactor chamber contains hydrogen gas, wherein the inner surface of each chamber has a surface coating comprising a catalyst selected from tungsten, nickel, titanium, platinum, palladium, and mixtures thereof;

a plasma power supply to generate a plasma inside the plurality of reactor chambers, wherein the plasma power supply is selected from a DC power supply, an AC power supply, and a radio frequence (RF) power supply;

a plasma pulse controller connected to the plasma power supply to turn the plasma power supply on and off and to generate plasma pulses inside the plurality of reactor chambers; and a heat exchanger coupled to the plurality reactor chamber to remove heat generated by the plasma, wherein the plurality of the sealed reactor chambers are connected to the plasma power supply and the plasma pulse controller; and a switch configured to switch the plasma power supply and the plasma pulse controller between the plurality of the sealed reactor chambers in series.

12. The pulse energy generator system according to claim 1, wherein the plasma power supply provides a pulsed electric power level between 1 watt and 20,000 watts per reactor chamber.

13. The pulse energy generator system according to claim 1, wherein the plasma power supply provides a pulsed electric power level between 50 watts and 1000 watts per reactor chamber.

14. The pulse energy generator system according to claim 1, wherein the plasma power supply provides a pulsed electric power level between 200 watts and 500 watts per reactor chamber.

15. The pulse energy generator system according to claim 1, wherein the sealed reactor chamber comprises a ceramic or metal housing and heat exchange tubing inside the housing, wherein the heat exchange tubing has an exterior coating comprising a catalyst selected from tungsten, nickel, titanium, platinum, palladium, and mixtures thereof.

16. The pulse energy generator system according to claim 1, wherein the sealed reactor chamber comprises oxygen-free copper.

17. The pulse energy generator system according to claim 1, wherein the plasma power supply comprises a cathode and anode, wherein the plasma power supply is a DC power supply configured to produce an arc between the cathode and anode.

18. The pulse energy generator system according to claim 17, further comprising at least one ceramic baffle disposed between the cathode and anode.

19. The pulse energy generator system according to claim 1, wherein the plasma power supply comprises a cathode and cathode, wherein the plasma power supply is an AC power supply configured to produce an arc between the cathode and cathode.

20. The pulse energy generator system according to claim 1, wherein the plasma power supply comprises the RF power supply connected to the sealed reactor chamber by an antenna dipole.

* * * * *